United States Patent [19]
Kishima

[11] 3,909,643
[45] Sept. 30, 1975

[54] DIRECT-DRIVEN TYPE PHONOGRAPH TURNTABLE

[75] Inventor: Yukihiro Kishima, Yokohama, Japan

[73] Assignee: Victor Company of Japan, Limited, Japan

[22] Filed: Mar. 25, 1974

[21] Appl. No.: 454,553

[30] Foreign Application Priority Data
- Mar. 24, 1973 Japan................................ 48-35787
- Mar. 24, 1973 Japan................................ 48-37788
- Feb. 20, 1974 Japan................................ 49-20337
- Feb. 20, 1974 Japan................................ 49-20338

[52] U.S. Cl. .................. 310/68; 310/156; 310/67; 310/190
[51] Int. Cl.² ........................................ H02K 1/12
[58] Field of Search......... 279/1 E; 310/68, 67, 156, 310/190, 191, 192, 193

[56] References Cited
UNITED STATES PATENTS

| | | | |
|---|---|---|---|
| 1,551,347 | 8/1925 | Trombetta | 310/67 |
| 3,315,106 | 4/1967 | Reynst | 310/191 X |
| 3,564,306 | 2/1971 | Ott et al. | 310/67 |
| 3,683,248 | 8/1972 | Kobayashi et al. | 310/156 X |
| 3,840,761 | 10/1974 | Muller | 310/156 X |

Primary Examiner—Donovan F. Duggan
Attorney, Agent, or Firm—Robert E. Burns; Emmanuel J. Lobato; Bruce L. Adams

[57] ABSTRACT

A direct-driven type phonograph turntable has a frame, a main shaft, a rotor having a plurality of equally circularly spaced magnets on the periphery thereof and an arc-shaped stator having a plurality of inwardly extending, equally spaced teeth in opposed relation to the magnets. Static unbalances and preferably, also dynamic unbalances of the rotor are compensated for by an arcuate-shaped member of a magnetically soft material. The arcuate-shaped member is located at a substantially symmetrical position to the arc-shaped stator with respect to the main shaft. More exactly, and preferably, this member has end portions mutually angularly spaced by an amount equal to a plurality of the center-to-center spacings of the magnets plus one half of the center-to-center spacing of said magnets.

6 Claims, 7 Drawing Figures

DIRECT-DRIVEN TYPE PHONOGRAPH TURNTABLE

The present invention relates to phonograph turntables and more particularly to a direct-driven type phonograph turntable and driving means therefor.

Direct-driven type phonograph turntables are known in the art wherein a rotor is supported coaxially to a turntable for unitary rotation therewith and a stator is provided around the full periphery of the rotor. The stator has a plurality of equally circularly spaced teeth which extend inwardly therefrom. The rotor has a plurality of equally spaced permanent magnets arranged on the periphery thereof in opposed relation to, and in proximity to the teeth. However, from the manufacturing standpoint, the production of the stator involves winding of each tooth with a coil or coils, which is time consuming and therefore uneconomical.

The principal object of the present invention is to provide an improved phonograph turntable driving assembly wherein an arc-shaped stator is provided to reduce the cost of the turntable assembly.

Another object of the present invention is to provide an improved phonograph turntable driving assembly wherein the static magnetic unbalance caused by the arc-shaped stator is eliminated.

Still another object of the invention is to provide an improved phonograph turntable driving assembly wherein dynamic magnetic unbalances caused by the terminal ends of the stator are eliminated.

A further object of the invention is to provide an improved phonograph turntable driving assembly wherein vibrations caused by the discrete arrangement of the stator teeth are eliminated.

In accordance with the present invention, there is provided a phonograph turntable driving assembly which comprises a frame, a main shaft, a rotor having a plurality of equally circularly spaced magnets on the periphery thereof and an arc-shaped stator having a plurality of inwardly extending teeth arranged at a predetermined phase angle spacing in opposed relation to the magnets. The present invention is characterized by a generally arc shaped member of a magnetically soft material and adjustably supported on the frame in juxtaposition to the magnets. The arcuate magnetically soft member establishes static balance of the rotor by being located in a position substantially opposed to and symmetrical with the stator. It has its opposite ends angularly spaced apart by an amount equal to a plurality of the center-to-center spacings of the magnets plus one half of the center-to-center spacing of said magnets, to avoid dynamic unbalance of the rotor.

These and other objects and features of the invention will be understood from the following description taken in conjunction with the accompanying drawings, in which.

Figure 1:
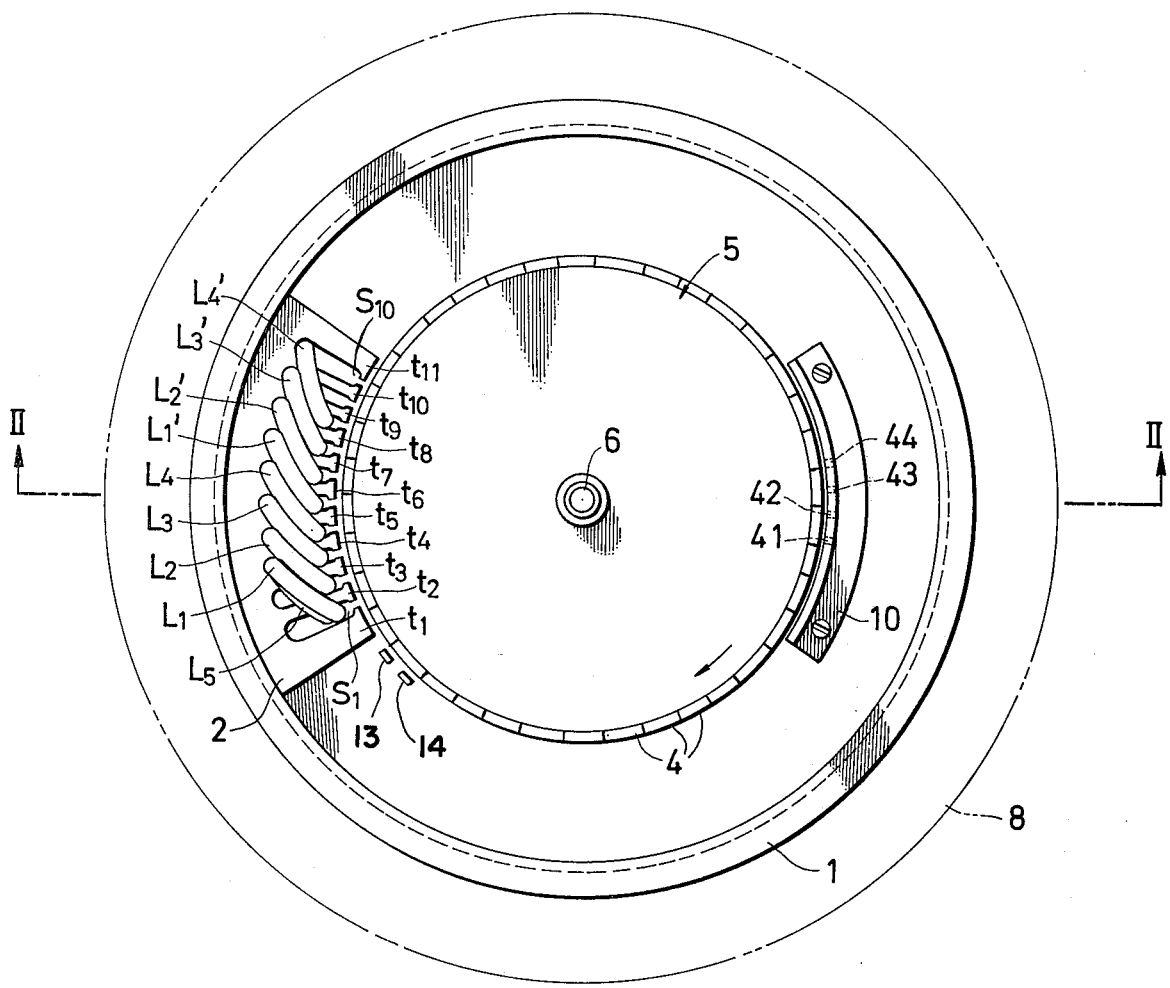
FIG. 1 is a plan view of a turntable driving mechanism in accordance with the present invention.
Figure 2:
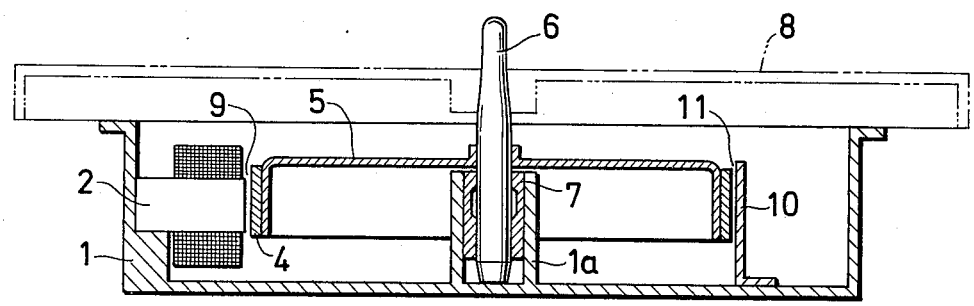
FIG. 2 is a cross-sectional view of the mechanism taken along a line II—II of FIG. 1.
Figure 3:
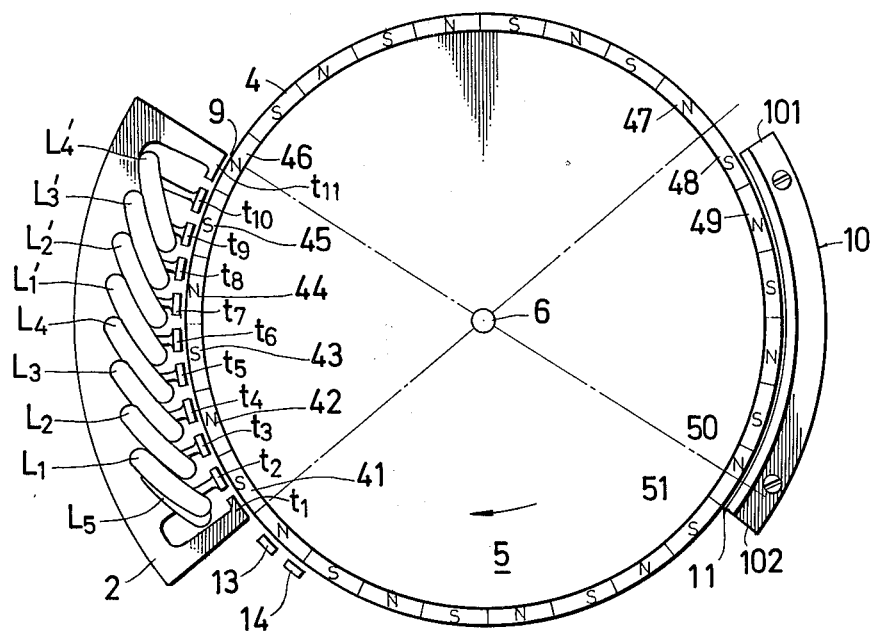
FIG. 3 is a schematic plan view of the mechanism showing an arcuate member being displaced a phase angle of 90° relative to the teeth of a stator.
Figure 5:
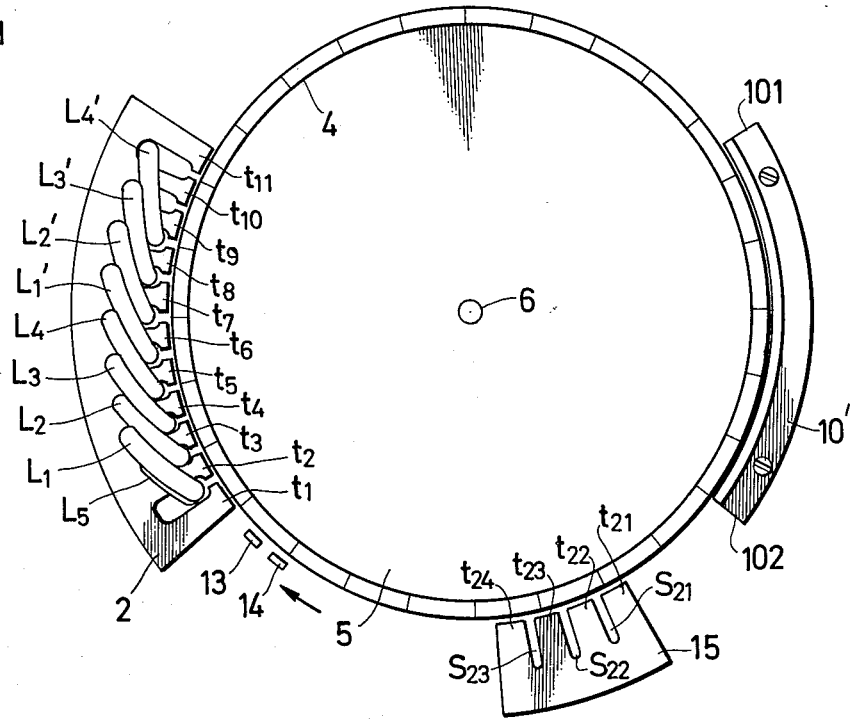
FIG. 5 is a schematic view of the mechanism showing a second arcuate member having a plurality of teeth located at a position displaced a phase angle of 45° relative to the stator teeth.
Figure 6:
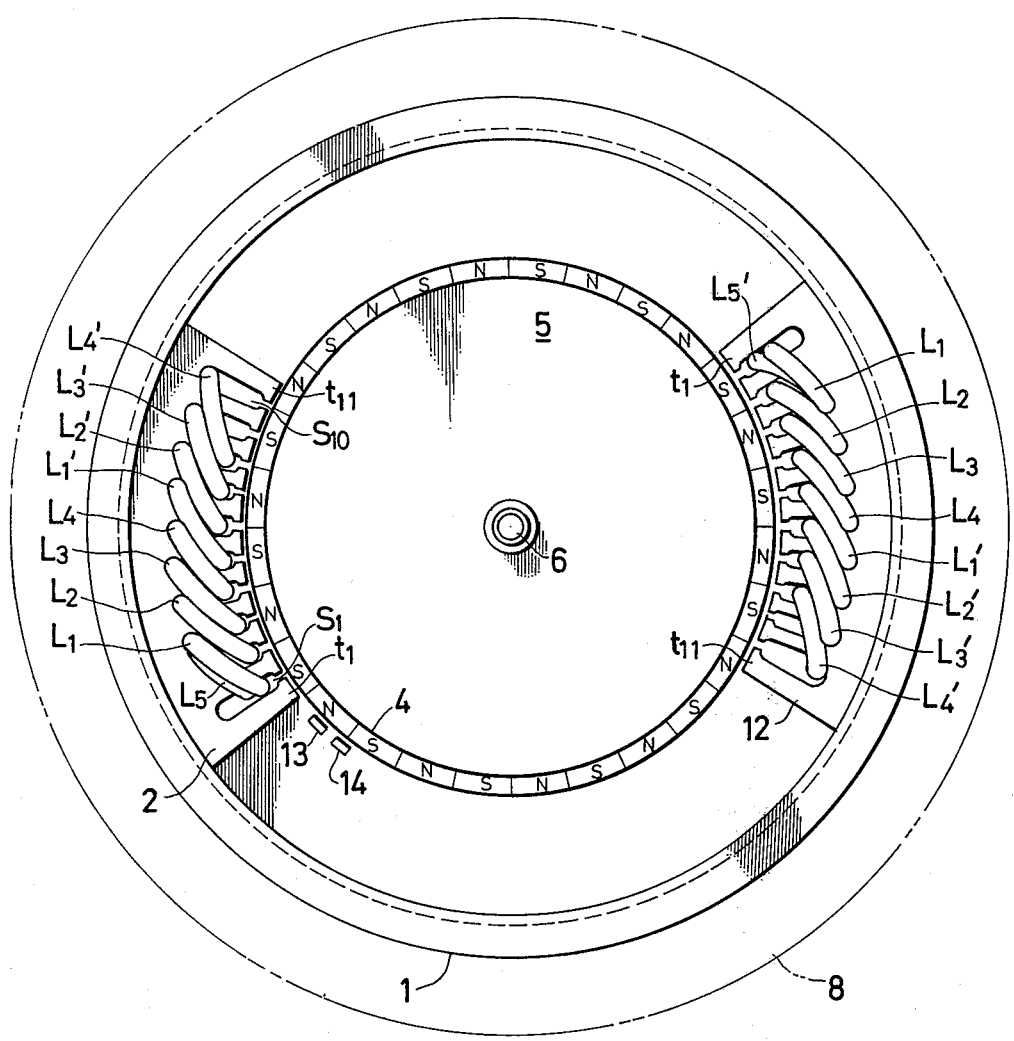
FIG. 6 is a plan view of the mechanism with a second stator located in opposed relation to the first stator.
Figure 7:
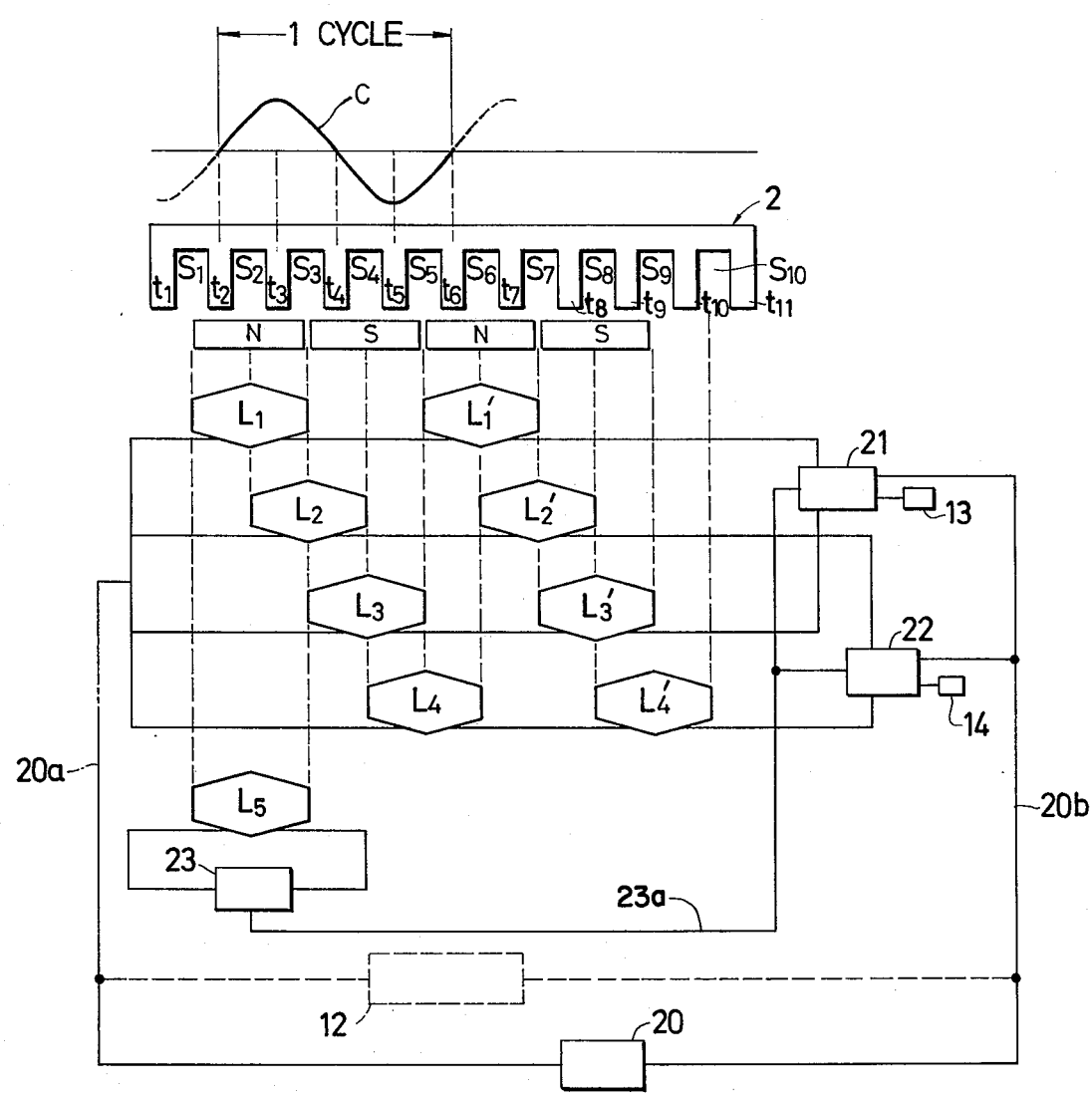
FIG. 7 is a schematic circuit diagram of the coils and the associated circuits of the mechanism.

Referring now to the drawings wherein like parts are indicated at similar numerals throughout the several figures, numeral 1 in FIGS. 1 and 2 indicates a turntable-supporting frame having an upright sleeve 1a in which a bearing 7 is provided to rotatably support an upright shaft 6 of a turntable 8. A rotor 5 has a plurality of, for example 28-pole permanent magnets 4 equally circularly arranged around the periphery thereof and coaxially coupled to the shaft 6 for unitary rotation with the turntable 8, as shown in FIGS. 3, 5 and 6. In accordance with the invention, an arc-shaped stator 2, extending for example over an arc of 70°, is supported on the inner wall of the frame 1. The stator 2 has a plurality of equally arcuately spaced teeth $t_1$ to $t_{11}$ with slots $S_1$ to $S_{10}$ therebetween. The teeth are arranged in opposed relation to the permanent magnets at half the center-to-center spacing of the permanent magnets. As shown in FIGS. 1 and 7, the teeth $t_2$ and $t_3$ adjacent one end of stator 2 are wound with coil $L_1$, similarly teeth $t_3$ and $t_4$ are wound with coil $L_2$; teeth $t_4$ and $t_5$ are wound with coil $L_3$; and teeth $t_5$ and $t_6$ are wound with coil $L_4$. Correspondingly, in the stator portion adjacent the other end, successive teeth $t_6$, $t_7$ are wound with coil $L_1'$; $t_7$, $t_8$ with $L_2'$; $t_8$, $t_9$ with $L_3'$; and $t_9$, $t_{10}$ with $L_4'$. Thus, except for teeth $t_2$ and $t_{10}$ each of the teeth is wound with two coils in an overlapped manner. As shown in FIG. 7, coils $L_1$ and $L_1'$ are series-connected to a drive circuit 21 and, in parallel to $L_1$, $L_1'$ the coils $L_3$ and $L_3'$ are also series-connected to the circuit 21. In like manner, coils $L_2$ and $L_2'$ are seriesconnected to a drive circuit 22 and coils $L_4$ and $L_4'$ are also series-connected to the drive circuit 22. A directcurrent power source 20 supplies current over leads 20a and 20b to the coils and the drive circuits. The drive circuits 21 and 22 are connected respectively to Hall-effect elements 13 and 14 arranged adjacent the tooth $t_1$ of the stator 2. A speed sensing coil $L_5$ is provided teeth $t_2$ and $t_3$ is connected to a speed-control circuit 23 which supplies a control signal through lead 23a to the drive circuits 21 and 22. The Hall-effect elements 13 and 14 are arranged at half the center-to-center spacing of permanent magnets 4 to ensure a phase difference of 90° therebetween (FIG. 3). For example, when the rotor 5 is driven and an N-pole of the permanent magnets 4 comes close to the Hall-effect element 13, the drive circuit 21 is brought into operation such that it provides a drive current to coils $L_1$ and $L_1'$ to produce a magnetic flux which produces attractive and repulsive forces between the interacting teeth and magnets and the rotor is driven an angle of 6.4° (360/28 × 2) which is equivalent to a phase displacement of 90°. This brings the adjacent S-poled magnet to come close to Hall-effect element 14 and the drive circuit 22 is brought into action to provide a drive current to coils $L_2$ and $L_2'$. The rotor 5 is further rotated an angle of 6.4° with the Halleffect element 13 at the closest position to an S-poled magnet. alternately, coils $L_3$ and $L_3'$, are energized by the drive circuit 21 to drive the rotor 5 to further rotate an angle of 6.4°, with the Hall-effect element 14 at the closest position to the next N-poled magnet. Likewise, coils $L_4$ and $L_4'$ are energized for further rotation of the rotor, wherein the same procedures are repeated to rotate the rotor on its pivot. As the permanent magnets move past the speed detecting coil $L_5$, a current will be induced in the coil and measured in the speed control circuit 23 which controls the current flowing through the coils $L_1$ to $L_4'$.

However, a static unbalance of rotor 5 will result from the unsymmetrical arrangement of the stator 2 with respect to the rotor. The static unbalance will create friction between the bearing 7 and the upright shaft 6, which will shorten the usable lifetime of the turntable. Furthermore, it is observed that at each end of the stator 2 there occurs dynamic magnetic unbalances for the following reasons: With the rotor 5 positioned as shown in FIG. 3, the teeth $t_1$ to $t_{10}$ are at positions facing five of the magnets 41 to 45 and the attractive forces caused by the individual teeth are cancelled. At one end of the stator, the next following sixth magnet 46 has only stator tooth $t_{11}$ to interact with. Here, an attractive force is produced which causes the rotor to rotate in a counterclockwise direction. However, this attractive force completely diminishes when the rotor 5 is rotated to a position displaced by ½ the center-to-center spacing of the magnets (corresponding with a phase of 45° in the electromagnetic cycle C, FIG. 7), since the junction of adjacent magnets 40 and 41 is brought in line with the central axis of the tooth $t_1$ and the junction of adjacent magnets 45 and 46 is brought in line with the central axis of tooth $t_{11}$. With a further rotation of the rotor to a position displaced by half the center-to-center spacing of the magnets from the original position, the magnet 40 comes closest to tooth $t_1$, but it has only tooth $t_1$ to interact. Therefore, an attractive force is produced therebetween which tends to rotate the rotor in a clockwise direction. As the rotor proceeds to rotate, such attractive forces are intermittently produced in opposite directions causing vibration to be transmitted to the turntable.

The present invention is characterized by an arcuate-shaped member 10 of a magnetically soft material disposed in substantially in symmetrical position to the stator 2 with respect to the shaft 6 of rotor 5. The arcuate member 10 has an L-shaped cross-section and is adjustably supported on the frame 1 in juxtaposition to the permanent magnets of the rotor 5 so that an attractive force may be produced rightwardly, which is opposite to that produced between the stator 2 and the rotor 5. Therefore, the presence of arcuate member 10 eliminates the above described static unbalance of the rotor caused by the arc-shaped stator, and the side pressure resulting from such unbalance and acting on the upright shaft is eliminated.

The arcuate magnetically soft member 10 may be extended along its arcuate path so that its extreme ends almost reach the opposite ends of the arc-shaped stator equilibrium be struck between the mutually opposing magnetic forces, and that rotor 5 be properly, statically balanced.

The length of the arcuate member 10 may preferably terminate at one end 102 thereof at a junction of rotor adjacent magnets such as 50 and 51 and at the other end 101 at the center portion of a rotor magnet such as 48. Thus the arcuate member is preferably angularly displaced from a fully symmetrical position by an amount equal to half the center-to-center spacing of the permanent magnets (FIG. 3). With this arrangement, the aforementioned vibration-inducing phenomenon occurs at the opposite ends of the arcuate member 10 but in directions opposite to that which occurs at the terminal ends of the stator 2, since at the end portion 101 an attractive force between the magnet 48 and that end portion causes the rotor 5 to move in a clockwise direction, which serves to cancel the counterclockwise attraction of rotor by the tooth $t_{11}$ (FIG. 3). With the rotation of rotor 5 by half the center-to-center spacing of the magents (90° phase shift relative to the teeth of stator 2), the same situation arises at the end portion 102 in such a manner as to rotate the rotor in a clockwise direction, which movement cancels the clockwise attraction of rotor by the tooth $t_1$. The periodically occurring magnetic unbalances caused by rotation of rotor 5 relative to stator 2 thus are completely cancelled by the periodically occurring counteractions provided by the arcuate member 10. Therefore, the above described dynamic unbalances and vibrations of rotor 5 are effectively eliminated.

Figure 4:
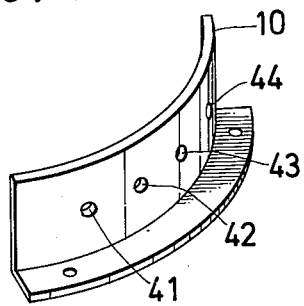
FIG. 4 is a perspective view of the arcuate member with a plurality of apertures therein.

As shown in FIGS. 1 and 4 the arcuate member 10 may preferably be provided with a plurality of apertures 41 to 44 equally spaced along the arcuate wall thereof, the apertures being located in positions opposite to teeth $t_8$, $t_7$, $t_6$ and $t_5$. These apertures 41 to 44 correspond, in function, with the slots between these teeth. They thereby counteract a further, inherent tendency toward vibrational rotation of the rotor. Due to the discrete arrangement of the teeth $t_1$ to $t_{11}$, and since the coils of the stator 2 are discretely energized, the rotor tends to rotate in a discrete, or intermittant manner causing such vibration motion. By the provision of apertures 41 to 44, the rotor 5 is subjected to the same but phase-opposite vibrations, so as to counteract the vibrations caused between the stator and the rotor. The number of apertures may be selected such that the opposedly acting vibrations are completely cancelled by each other. In FIG. 5, an arcuate member 15 of magnetically soft material having teeth $t_{21}$ to $t_{24}$ is provided adjacent an arcuate member 10 having no apertures. These teeth form therebetween slots $S_{21}$ to $S_{23}$ and are equally spaced apart, as the teeth of the stator 2. It is to be noted that the member 15 is located in a position displaced ¼ of the center-to-center spacing of the magnets, which is equivalent to a phase shift of 45°, relative to the stator 2. With this arrangement, the teeth $t_{21}$ to $t_{24}$ produce a vibration having an opposite phase to that produced by teeth $t_1$ to $t_{11}$, thereby cancelling the latter. In FIG. 6, a second stator 12 of the same construction as the stator 2 is provided in a position opposite to the stator 2 and electrically connected in parallel to the stator 2 shown in FIG. 7. The second stator 12 serves the function of eliminating the above-described static unbalance and periodic vibrations caused by the terminal ends of the stator 2. The provision of the second stator 12 adds to the amount of torque, as may be required with an increase in the size of turntable. Furthermore, a standardized size of the stator can thus be employed, which will provide efficiency in production and economy.

While the foregoing description has been concerned with an inner-rotor type direct-current brushless driving assembly, the present invention is not limited to this type of assembly. The principle of the invention is also applicable to an outer-rotor type or any other type of direct drive phonograph turntable.

What is claimed is:

1. A phonograph turntable driving assembly, comprising;

a frame;

rotor means having a plurality of equally angularly spaced magnets on a periphery thereof and rotatably supported on said frame for rotating a turntable;

arc-shaped stator means embracing only a portion of said periphery of said rotor means, having a plurality of inwardly extending, equally angularly spaced stator teeth in opposed relation to said magnets, and having electromagnetic coil and circuit means for magnetizing said stator teeth to cyclically attract and repel said magnets and thereby to rotate said rotor means; and means located in a substantially symmetrical position with respect to said stator means for compensating for static and dynamic unbalances of said rotor means resulting from the cyclic attracting and repelling of said magnets by the magnetized stator teeth, comprising a generally arc-shaped member of magnetically soft material, supported on said frame in opposed relation to said magnets.

2. A phonograph turntable driving assembly as claimed in claim 1, wherein said generally arc-shaped member has ends located at positions displaced from one another by an amount equal to one half of the center-to-center spacing of said magnets.

3. A phonograph turntable driving assembly as claimed in claim 1, wherein said generally arc-shaped member has a plurality of equally angularly spaced apertures in positions angularly symmetrical to spaces between said teeth.

4. A phonograph turntable driving assembly as claimed in claim 1, further including second arc-shaped means of a magnetically soft material supported on said frame and having a plurality of second teeth equally spaced as said teeth of said stator means in opposed relation to said magnets, said second teeth being located at angular positions displaced by one-fourth of the angular spacing of said magnets relative to said stator teeth.

5. A phonograph turntable driving assembly as claimed in claim 1, wherein said means for compensating is a second generally arc-shaped stator having stator teeth and coil means similar to those of said stator means; said stator means and second stator jointly embracing only a portion of the periphery of said rotor means.

6. A phonograph turntable driving assembly, comprising, a frame, a main shaft, a rotor having a plurality of equally circularly spaced magnets on the periphery thereof and rotatably supported on said frame, by said shaft, a first arc-shaped stator embracing only a portion of the periphery of said rotor and having a plurality of inwardly extending, equally arcuately spaced teeth in opposed relation to said magnets, and second arc-shaped stator means constructed substantially the same as said first arc-shaped stator and located in a substantially symmetrical position to said first arc-shaped stator with respect to said main shaft for compensating for static and dynamic magnetic unbalances of said rotor.

* * * * *